(12) United States Patent
Baker et al.

(10) Patent No.: US 10,677,282 B2
(45) Date of Patent: Jun. 9, 2020

(54) ATTACHMENT DEVICE

(71) Applicants: Jason D. Baker, Jamestown, OH (US); Roger L. Mears, Englewood, OH (US)

(72) Inventors: Jason D. Baker, Jamestown, OH (US); Roger L. Mears, Englewood, OH (US)

(73) Assignee: A-TACH-IT, LLC, Jamestown, OH (US)

( * ) Notice: Subject to any disclaimer, the term of this patent is extended or adjusted under 35 U.S.C. 154(b) by 0 days.

(21) Appl. No.: 16/006,286

(22) Filed: Jun. 12, 2018

(65) Prior Publication Data
US 2019/0376549 A1 Dec. 12, 2019

(51) Int. Cl.
*F16B 45/00* (2006.01)
*E04H 17/16* (2006.01)

(52) U.S. Cl.
CPC ............. *F16B 45/00* (2013.01); *E04H 17/16* (2013.01)

(58) Field of Classification Search
CPC ................................. F16B 45/00; E04H 17/16
USPC ........................................................ 248/339
See application file for complete search history.

(56) References Cited

U.S. PATENT DOCUMENTS

| | | | | |
|---|---|---|---|---|
| 1,338,384 A | * | 4/1920 | Loyland | A47G 1/24 248/490 |
| 2,791,461 A | | 5/1957 | Goldenberg | |
| 3,126,190 A | * | 3/1964 | Miller | B60R 13/105 248/206.5 |
| 3,264,026 A | * | 8/1966 | Hansen | B66F 9/12 294/2 |
| 3,275,073 A | | 9/1966 | Pincus | |
| 3,718,947 A | * | 3/1973 | Huber | B66C 1/14 24/298 |
| 4,049,126 A | * | 9/1977 | Halverson | A63B 71/0045 211/104 |
| 4,193,495 A | * | 3/1980 | Keeley | A63B 71/0045 294/143 |
| 4,582,284 A | | 4/1986 | Veenstra | |
| 4,629,065 A | * | 12/1986 | Braaten | A63B 69/0002 206/315.1 |
| 4,646,396 A | * | 3/1987 | Geese | F16B 45/02 223/88 |
| 5,275,381 A | | 1/1994 | Cluff et al. | |
| 5,294,005 A | * | 3/1994 | Hedges | A47F 5/083 211/85.7 |
| 5,337,907 A | * | 8/1994 | McKenzie | A45F 3/00 206/427 |
| 5,457,911 A | | 10/1995 | Vollink | |
| 5,556,080 A | | 9/1996 | Vise | |

(Continued)

FOREIGN PATENT DOCUMENTS

CN 201797267 U * 4/2011
CN 202321965 U * 7/2012
(Continued)

*Primary Examiner* — Kimberly T Wood
(74) *Attorney, Agent, or Firm* — Thompson Hine LLP

(57) ABSTRACT

A system including an attachment device having a generally flat plate having a securement structure, and two hooks movably coupled to the plate. A base end of each hook is spaced apart by a natural number multiple of a hook spacing distance, and the hook spacing distance is between about 1¾ inches and about 2¼ inches, or is between about 2¾ inches and about 3¼ inches.

11 Claims, 5 Drawing Sheets

(56) References Cited

U.S. PATENT DOCUMENTS

| | | | | |
|---|---|---|---|---|
| 5,626,244 | A | * | 5/1997 | Mesna ............... A47F 5/083 |
| | | | | 211/60.1 |
| 5,664,780 | A | * | 9/1997 | Bricker ............... A63B 71/06 |
| | | | | 273/239 |
| 5,690,235 | A | * | 11/1997 | Matzen ............ A63B 71/0045 |
| | | | | 211/60.1 |
| 5,871,193 | A | * | 2/1999 | Jacobs ............... D07B 1/185 |
| | | | | 24/16 PB |
| D417,807 | S | | 12/1999 | McBarnette |
| 6,053,340 | A | * | 4/2000 | Cameron ............... A47B 81/00 |
| | | | | 211/85.7 |
| 6,442,891 | B1 | * | 9/2002 | Roy ................... A01G 17/10 |
| | | | | 47/42 |
| D476,217 | S | * | 6/2003 | Shea ............... A63B 71/0036 |
| | | | | D8/354 |
| 6,749,074 | B1 | | 6/2004 | Hileman et al. |
| D493,056 | S | * | 7/2004 | Shornak ............... D6/552 |
| 7,100,878 | B2 | * | 9/2006 | Shea ................... A47F 5/0807 |
| | | | | 211/90.02 |
| 7,331,881 | B2 | * | 2/2008 | Smith ................ A63B 63/083 |
| | | | | 473/481 |
| 7,757,996 | B2 | * | 7/2010 | Jacobs ............... H02G 3/30 |
| | | | | 248/302 |
| 7,841,467 | B2 | | 11/2010 | Slayton |
| 8,371,457 | B2 | | 2/2013 | Entz |
| 8,523,127 | B1 | | 9/2013 | Bennett |
| 8,616,385 | B1 | * | 12/2013 | Doran ............... A63B 71/0036 |
| | | | | 211/85.7 |
| D698,186 | S | | 1/2014 | Funchess |
| 8,991,883 | B1 | | 3/2015 | Butterfield, IV |
| 2003/0062328 | A1 | * | 4/2003 | Millard ............ A63B 71/0045 |
| | | | | 211/85.7 |
| 2005/0193533 | A1 | * | 9/2005 | Chang ............... F16B 45/02 |
| | | | | 24/601.4 |
| 2013/0305494 | A1 | * | 11/2013 | Handwerger ........ A45F 5/00 |
| | | | | 24/302 |
| 2015/0320196 | A1 | * | 11/2015 | Polizzi ............... A47B 5/02 |
| | | | | 320/101 |

FOREIGN PATENT DOCUMENTS

| | | | |
|---|---|---|---|
| CN | 203903771 U | * | 10/2014 |
| CN | 204243605 U | * | 4/2015 |
| CN | 206901584 U | * | 1/2018 |
| CN | 206942157 U | * | 1/2018 |
| JP | 2001104142 A | * | 4/2001 |

* cited by examiner

ATTACHMENT DEVICE

The present disclosure is related to an attachment device, more particularly, to an attachment device for securement to a piece of expanded metal or the like.

BACKGROUND

Expanded metal, fence systems and the like are widely used as structural components, to form enclosures and secured areas, etc. It may be desired to attach a component to such expanded metal or fence systems. However, existing attachment devices for coupling to such expanded metal or fence systems are not sufficiently easy to install, and/or are not sufficiently robust.

SUMMARY

Accordingly, this disclosure is directed to an attachment system which can be quickly, easily and robustly attached to expanded metal, fence systems or the like. The attachment device can include an opening or other securement structure such that other items can thereby be coupled to the expanded metal, fence systems or the like. More particularly, in one embodiment, the disclosure is directed to a system including an attachment device having a generally flat plate having a securement structure, and two hooks movably coupled to the plate. A base end of each hook is spaced apart by a natural number multiple of a hook spacing distance, and the hook spacing distance is between about 1¾ inches and about 2¼ inches, or is between about 2¾ inches and about 3¼ inches.

BRIEF DESCRIPTION OF DRAWINGS

FIG. 1A is a front view of another embodiment of an attachment device;

DETAILED DESCRIPTION

Figure 1:
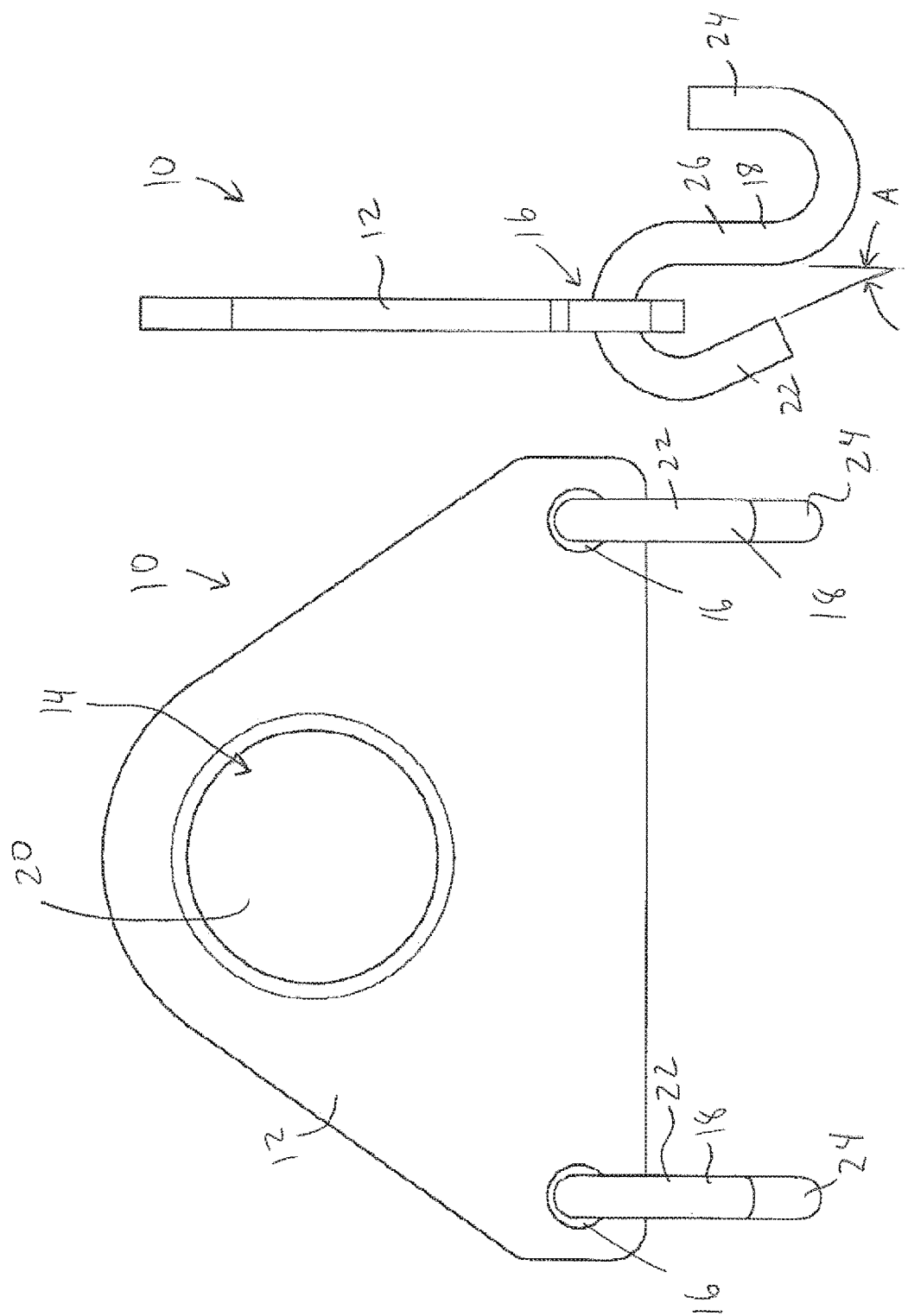
FIG. 1 is front view of one embodiment of an attachment device.
Figure 2:
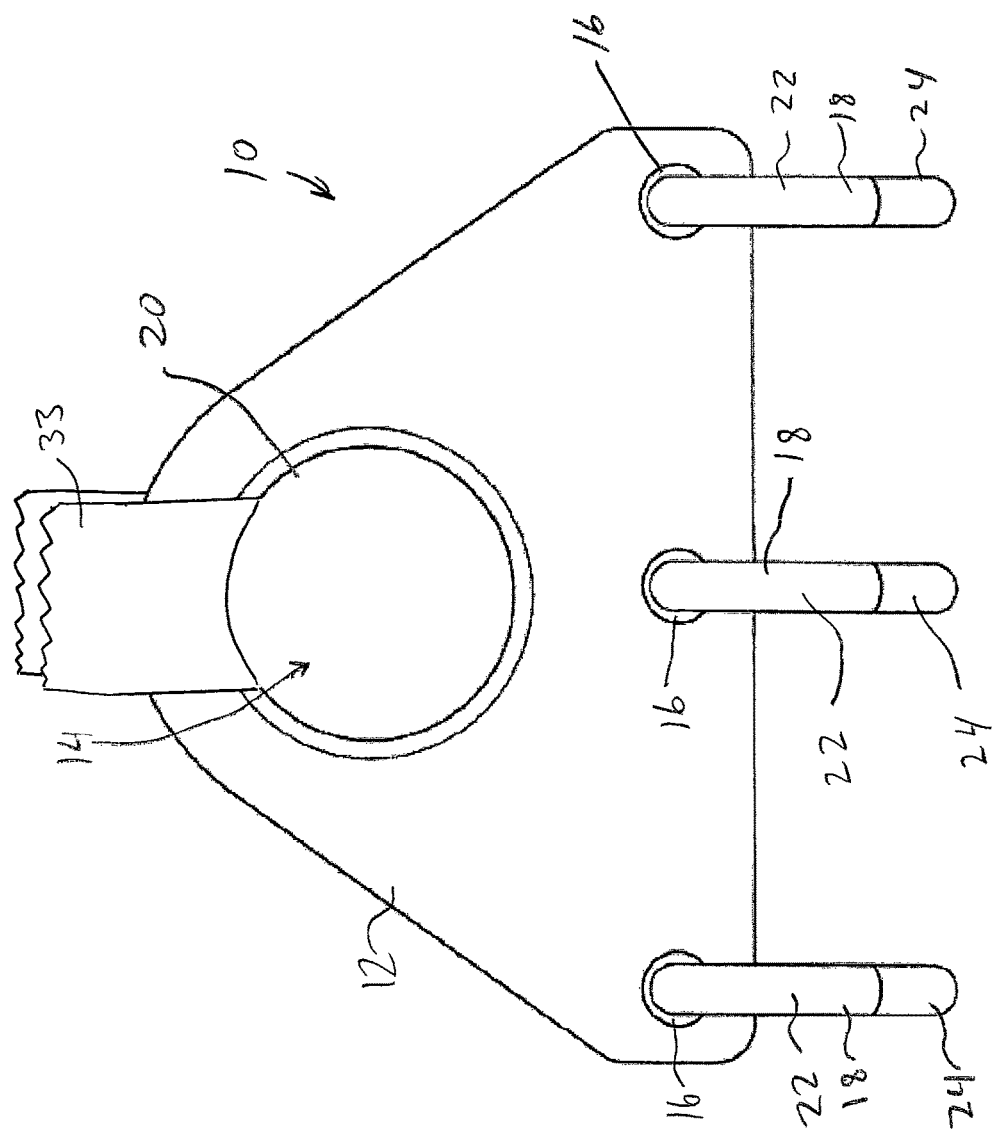
FIG. 2 is a side view of the attachment device of FIG. 1.

As shown in FIGS. 1-4, in one embodiment the device 10 includes a generally flat plate 12 having a generally triangular shape. In the illustrated embodiment, the plate 12 is generally shaped as an isosceles triangle (more particularly, a non-equilateral isosceles triangle). The plate 12 has a securement structure 14 positioned adjacent to a vertex corner of the triangle, and a pair of hook openings 16 positioned adjacent to a base edge of the triangle, at or adjacent to the remaining corners. The device 10 can further include a pair of hooks 18, where each hook 18 is received through an associated hook opening 16.

In the illustrated embodiment, the vertex corner of the plate triangle is rounded, and the other two corners are truncated to avoid sharp corners and provide improved strength and durability to the plate 12. However, it should be understood that the plate 12 can take any of a wide variety of shapes beyond that shown herein, including shapes other than generally triangular, such as squares, rectangles, circles, irregular and regular polygons, and irregular shapes, as desired.

The plate 12 can be made of a variety of materials, but in one embodiment is made of metal, such as stainless steel, but could also be made of plastics, composites, etc. that are sufficiently strong and durable to provide the functionality set forth herein. The plate 12 can have a variety of thicknesses, less than about one-quarter inch in one case, and about one-eighth of an inch in one particular case, and greater than about one sixteenth of an inch in another case.

In the illustrated embodiment, the securement structure 14 takes the form of an opening 20 entirely formed/positioned in the plate 12 such the entire outer perimeter of the opening 20 is surrounded by remaining material of the plate 12. However, the securement structure 14 can take any of a variety of other shapes or structures including, for example, an opening that intersects the outer perimeter of the plate 12 to form a pair of opposed gripping hooks. Moreover, the securement structure 14 can take various other forms, such as a hook passed through another opening or welded to the plate 12, an arm or bar coupled to the plate 12, etc.

Each hook 18 can be generally "S" shaped having a base end 22 received through the plate 12/hook opening 16, a free, distal end 24, and a middle portion 26 positioned between the base end 22 and the distal end 24 along a serpentine length of the hook 18. The junction between the base end 22 and the middle portion 26, and between the distal end 24 and the middle portion 26, may each be curved, while the remainder of the base end 22, distal end 24 and middle portion 26 can be straight or generally straight. The base end 22 of each hook 18 may form an angle A (FIG. 2) with the middle portion 26 that is relatively sharp, such as about 35° or more in one case. The angle A should be sufficiently large such that the gap between the end of base end 22 and the middle portion 26 is relatively small (e.g. smaller than the thickness of the plate 12 in one case) so that the hook 18 is permanently and non-removably secured to the plate 12. However the base end 22 should still be relatively loosely coupled to the plate 12, and allow some clearance, so that each hook 18 is movable relative to the plate 12. In particular each hook 18 may be movably secured to the plate 12 such that each hook 18 can be pivoted around multiple axes and positioned relative to the plate 12 in multiple orientations and angles so that the hooks 18 can be arranged in the desired configuration.

Figure 6:
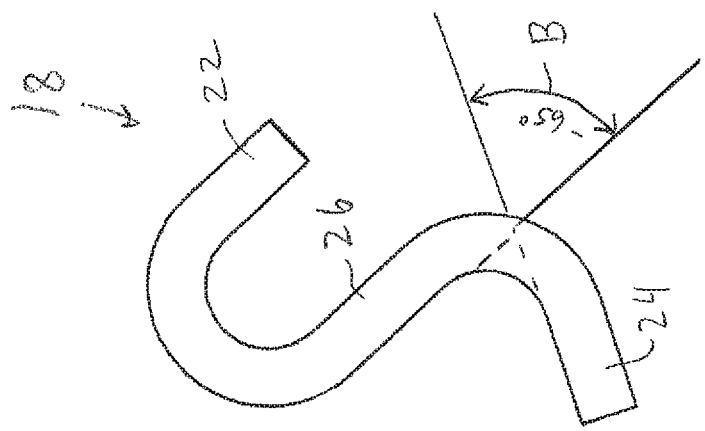
FIG. 6 is a side view of another hook usable in the attachment device of FIGS. 1-4, with a relatively large angle at its distal end.
Figure 5:
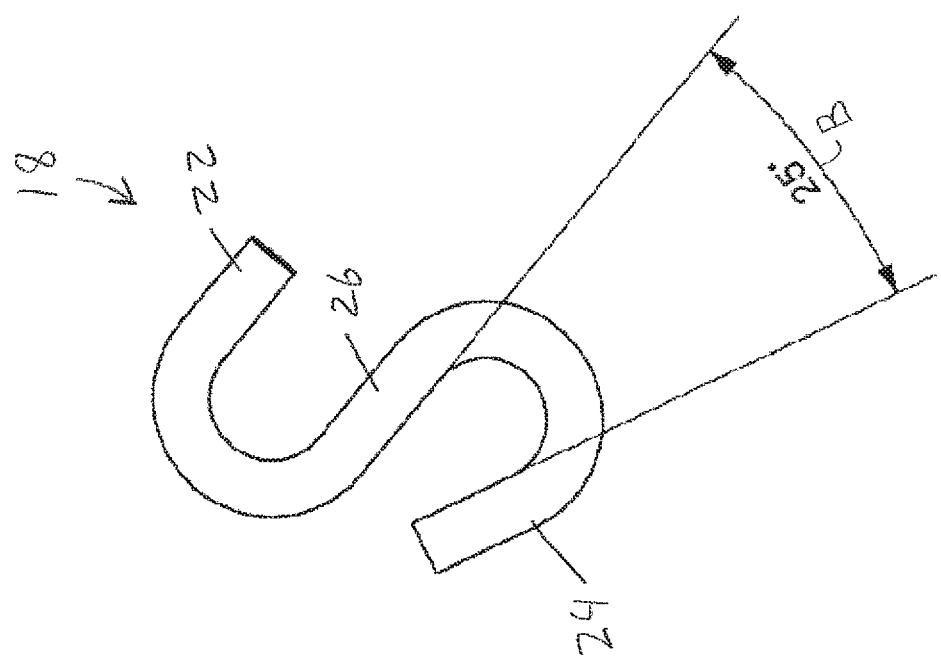
FIG. 5 is a side view of a hook usable in the attachment device of FIGS. 1-4, with a relatively small angle at its distal end.

With reference to FIGS. 5 and 6, the distal end 24 of each hook can form an angle B with the middle portion 26, and in some cases the angle B is smaller (e.g. less than about 25 degrees in one case or less than about 35 degrees in another case), and not as sharp, as the angle A. In the embodiment shown in FIG. 2, the distal end 24 of the hook 18 is generally parallel with the middle portion 26, and forms an angle B of zero. In other embodiments, for example shown in FIGS. 5 and 6, the angle B the base end 24 forms with the middle portion 26 varies between about 25° (FIG. 5) and about −65° (FIG. 6). The angle B of the distal end 24 should be selected such that the hook 18 can be easily secured to a piece of material 30 (as described in greater detail below) and retained in place, and is also relatively easily removed, but is not so large as to be inadvertently removed from the piece of material 30 during use.

Figure 3:
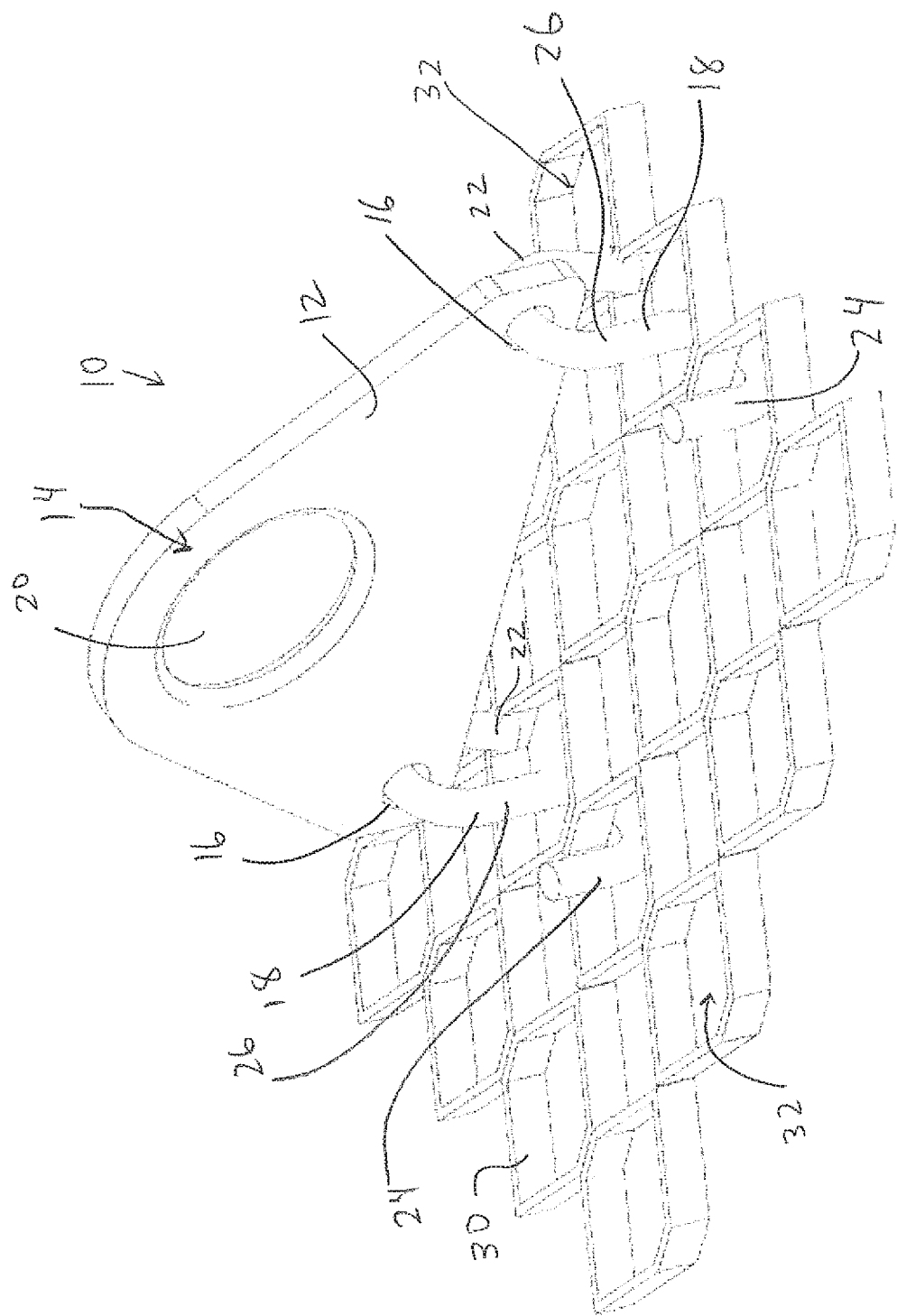
FIG. 3 is perspective view of the attachment device of FIG. 1, shown coupled to a piece of expanded metal.
Figure 4:
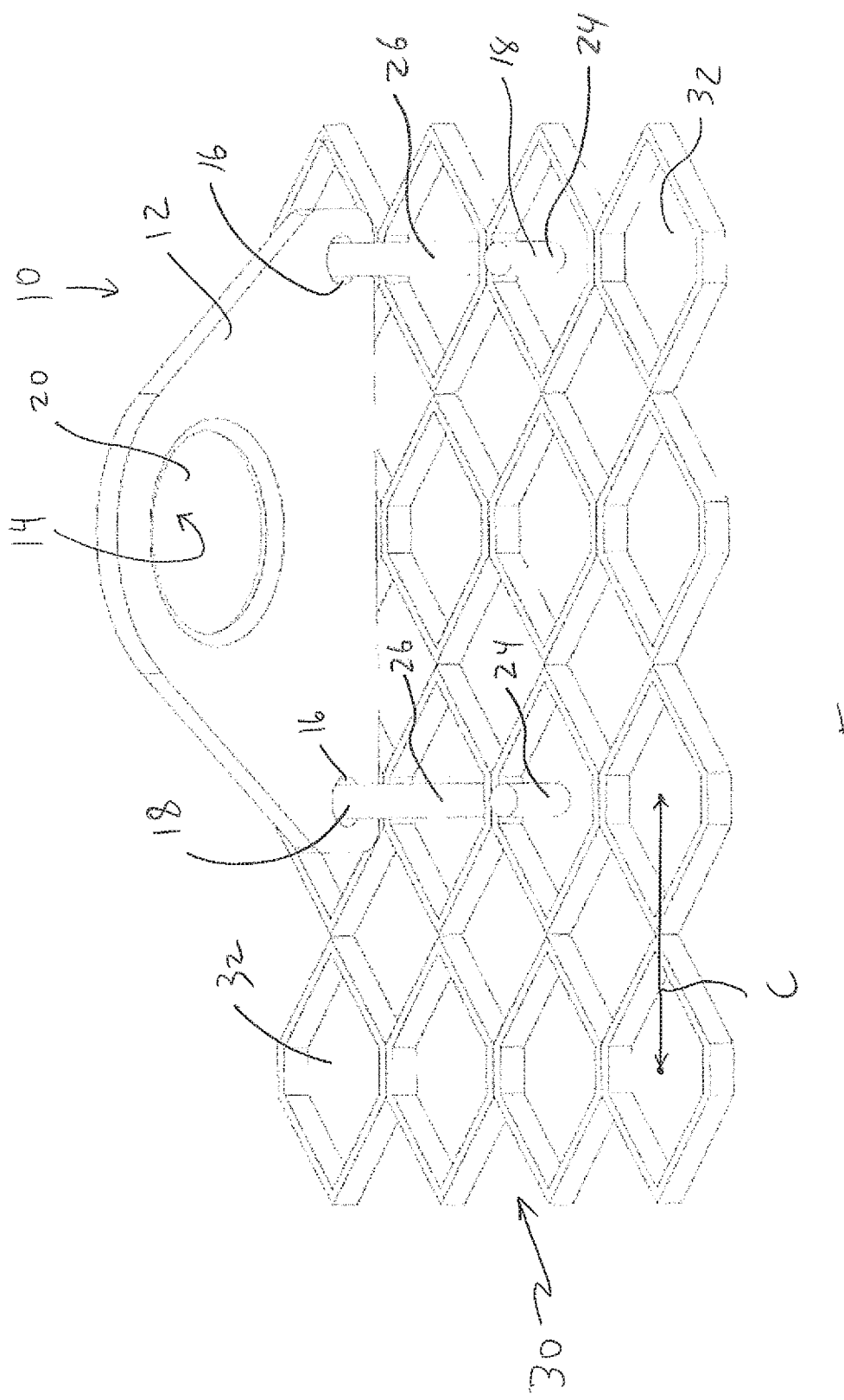
FIG. 4 is another perspective view of the attachment device of FIG. 1, shown coupled to a piece of expanded metal.

With reference to FIGS. 3 and 4, the attachment structure 10 is configured to be secured or attached to a piece of material 30, such as a piece of expanded metal material in the illustrated embodiment. The piece of material 30 can have a plurality of regularly-spaced openings 32 formed therein, which are generally diamond-shaped (with flattened corners at 2 corners thereof) in the illustrated embodiment. The openings 32 of the piece of material and/or the geometric center of the openings 32 can have a consistent spacing (in a single or lateral (left-to-right direction, as shown), and/or in the opposite longitudinal direction) of a distance C (FIG. 4) which is termed herein an opening-spacing distance, or hook-spacing distance. In one embodiment, the opening-spacing distance/hook-spacing distance C is between about one and three-quarter inches and about two and one-quarter inches, and is about two inches in one particular case. In another embodiment, the opening-spacing distance/hook-spacing distance C is between about two and three-quarter inches and about three and one-quarter inches, and is about three inches in one particular case. In yet another case, the distance C can be between about one and three-quarter inches and about three and one-quarter inches. However, the distance C can be varied as desired and depending upon the nature of the piece of material 30.

The hook openings 16, and/or base ends of the hooks 18, and/or portions of the hooks 18 where received through the hook openings 16, can be spaced apart by a natural number (e.g. one, two, three, four, etc.) multiple of the distance C. Thus, for example in the embodiment shown in FIGS. 4 and 5, the hook openings 16 of the hooks 18 are spaced apart, by a multiple of two, of the distance C. By spacing the hooks 18 apart by a natural number of multiple of the distance C, the hooks 18 can be easily secured to the piece of material 30.

In order to secure the attachment device 10 to the piece of expanded metal material 30, each hook 18 is passed through an opening 32 of the material 30 such that a middle portion 26 of each hook 18 extends through one opening 32, and the distal end 24 of each hook 18 extends through another, adjacent opening 32, as shown in FIGS. 3 and 4. Once the attachment device 10 is secured in place, a strap, loop, rope, cord, hook or other component 33 can be passed through the securement structure 14. In this manner, the attachment device 10 is securely held in place and can be used to anchor ropes, cords, cables, tools and other components to the piece of expanded metal material 30 or the like.

The illustrated embodiment shows the attachment device 10 with two hooks 18. However, the attachment device 10 can have additional hooks 18, and in one embodiment each additional hook 18 is spaced apart from the other hooks 18 by a natural number of multiple of the distance C. In one particular embodiment as shown in FIG. 1A, a third or supplemental hook 18 can be positioned in the middle of the plate 12 of FIGS. 1-4, adjacent the base edge and equidistant between the two illustrated hooks 18. The use of this third, additional hook 18 can provide additional strength during attachment, but if desired can be omitted for materials savings and/or ease of operation. Additional hooks 18, at various locations, can be utilized if desired.

Although the invention is shown and described with respect to certain embodiments, it should be clear that modifications will occur to those skilled in the art upon reading and understanding the specification, and the present invention includes all such modifications.

What is claimed is:

1. A system comprising an attachment device including:
   a generally flat, generally triangular plate having a securement structure positioned adjacent a first corner of said plate, wherein said securement structure includes an opening having an outer perimeter entirely positioned within said plate; and
   at least two hooks movably coupled to said plate positioned adjacent to second and third corners, respectively, of said plate, wherein each hook is passed through a hook opening that is of a smaller size than the opening of the securement structure, wherein a base end of each hook is spaced apart by a natural number multiple of a hook spacing distance, wherein the hook spacing distance is between about 1¾ inches and about 2¼ inches, or is between about 2¾ inches and about 3¼ inches, wherein each hook is generally "S"-shaped, wherein each hook opening non-removably directly receives the base end of an associated hook therethrough, wherein said plate is generally shaped as non-equilateral isosceles triangle in front view, wherein said securement structure is positioned adjacent to a vertex of said triangle defined by said first corner, and wherein each hook is positioned adjacent to a base edge of said triangle, wherein the system further comprises a supplemental hook movably coupled to said plate, and wherein a base end of said supplemental hook is spaced apart from at least one of said at least two hooks by said hook spacing distance, and wherein said base end of said supplemental hook and said base ends of said at least two hooks are all positioned adjacent to said base edge of said plate, and wherein said plate is made of metal and has a thickness of less than about ¼ inch.

2. The system of claim 1 wherein said hook spacing distance is about 2 inches.

3. The system of claim 1 wherein the base end of each hook is spaced apart by about 2 inches, or wherein said hook spacing distance is about 3 inches.

4. The system of claim 1 wherein the hook openings are spaced apart by the natural number multiple of the hook spacing distance.

5. The system of claim 1 wherein each base end is received through said plate, and wherein each hook further includes a distal end, and a middle portion positioned between said base end and said distal end, wherein said base end forms a sharper angle with said middle portion than said distal end forms with said middle portion.

6. The system of claim 1 wherein each of the at least two hooks has a base end received through said plate, a distal end, and a middle portion positioned between said base end and said distal end, wherein said distal end forms an angle of between about 25 degrees and about −65 degrees with said middle portion.

7. The system of claim 1 further comprising a generally flat, planar piece of expanded metal material having generally diamond-shaped openings, wherein the openings of said piece of expanded metal material are spaced apart, on center, by said hook spacing distance.

8. The system of claim 7 wherein each of the at least two hooks extends through one of said openings of said piece of expanded metal material to secure said attachment device to said piece of expanded metal material.

9. The system of claim 1 wherein said plate is generally planar and includes a first hole formed therethrough defining said securement structure, and a second hole and third hole formed therethrough defining said hook openings, and wherein said plate and said first, second and third holes are all coplanar.

10. The system of claim 1 wherein said plate is a single piece of flat material and lacks any flanges or protrusions coupled thereto or extending therefrom, besides any hooks which may be coupled to the piece of material or extend from the piece of material.

11. The system of claim 1 wherein the flat plate of said attachment device is generally triangular and lacks any hooks formed thereby.

\* \* \* \* \*